US009418311B2

(12) United States Patent
Bai et al.

(10) Patent No.: US 9,418,311 B2
(45) Date of Patent: Aug. 16, 2016

(54) MULTI-SCALE TONE MAPPING

(71) Applicant: Apple Inc., Cupertino, CA (US)

(72) Inventors: Yingjun Bai, San Jose, CA (US); Xuemei Zhang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 14/477,679

(22) Filed: Sep. 4, 2014

(65) Prior Publication Data

US 2016/0070974 A1  Mar. 10, 2016

(51) Int. Cl.
*G06K 9/00* (2006.01)
*G06K 9/46* (2006.01)
*G06F 17/30* (2006.01)

(52) U.S. Cl.
CPC .......... *G06K 9/4661* (2013.01); *G06F 17/3028* (2013.01); *G06K 9/46* (2013.01); *G06K 9/4642* (2013.01); *G06K 2009/4666* (2013.01)

(58) Field of Classification Search
None
See application file for complete search history.

(56) References Cited

U.S. PATENT DOCUMENTS

| 4,731,671 | A | 3/1988 | Alkofer |
| 6,717,698 | B1 | 4/2004 | Lee |
| 7,506,135 | B1 | 3/2009 | Mimar |
| 9,113,089 | B2 | 8/2015 | Zhang |
| 2002/0171852 | A1* | 11/2002 | Zhang ..................... G06T 5/009 358/1.9 |
| 2003/0021488 | A1 | 1/2003 | Shaw |
| 2004/0057632 | A1 | 3/2004 | Gindele |
| 2006/0182361 | A1 | 8/2006 | Ptucha |
| 2007/0014470 | A1 | 1/2007 | Sloan |
| 2007/0252834 | A1 | 11/2007 | Fay |
| 2008/0285853 | A1* | 11/2008 | Bressan ................... G06T 5/009 382/169 |
| 2009/0100339 | A1 | 4/2009 | Wharton-Ali |
| 2010/0157078 | A1 | 6/2010 | Atanassov |
| 2010/0226547 | A1 | 9/2010 | Criminisi |
| 2012/0170842 | A1 | 7/2012 | Liu |
| 2012/0188247 | A1 | 7/2012 | Cheung |
| 2013/0329093 | A1 | 12/2013 | Zhang |
| 2014/0247870 | A1 | 9/2014 | Mertens |
| 2015/0110399 | A1* | 4/2015 | Valdes Lopez ...... H04N 1/4074 382/167 |

OTHER PUBLICATIONS

Durand, Fredo and Julie Doresy. "Fast Bilateral Filtering for the Display of High-Dynamic-Range Images." http//: people.csail.mit.edu/fredo/PUBLI/Siggraph2002/ Accessed Mar. 16, 2012. pp. 1-7.
FAQ—HDR Images for Photography. http//:www.hdrsoft.com/resources/dri.html Accessed Mar. 16, 2012. pp. 8.

* cited by examiner

*Primary Examiner* — Eueng-Nan Yeh
(74) *Attorney, Agent, or Firm* — Blank Rome LLP

(57) ABSTRACT

Methods, devices and computer readable instructions to generate multi-scale tone curves are disclosed. One method includes finding, for a given input image, a global tone curve that exhibits monotonic behavior. The input image may then be partitioned into a first number of sub-regions. For each sub-region, a local tone curve may be determined that has an output level that is constrained to the global tone curve at one or more first luminance levels so that each sub-region's local tone curve's output follows the global tone curve's monotonic behavior. If the resulting local tone curves provide sufficient control of shadow-boost, highlight-suppression, and contrast optimization the first number of local tone curves may be applied directly to the input image. If additional control is needed, each sub-region may again be partitioned and local tone curves determined for each of the new sub-regions.

23 Claims, 4 Drawing Sheets

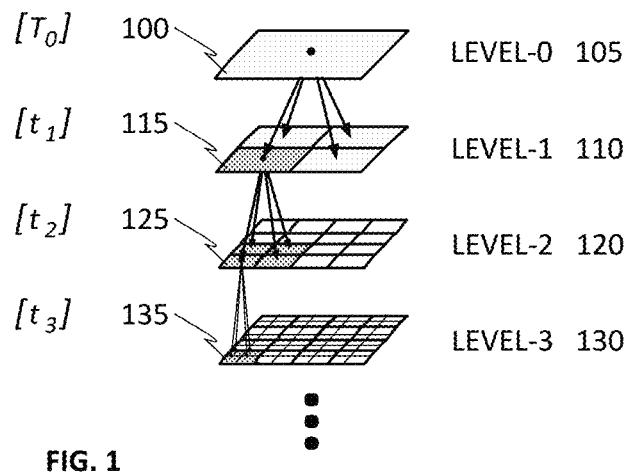
FIG. 1
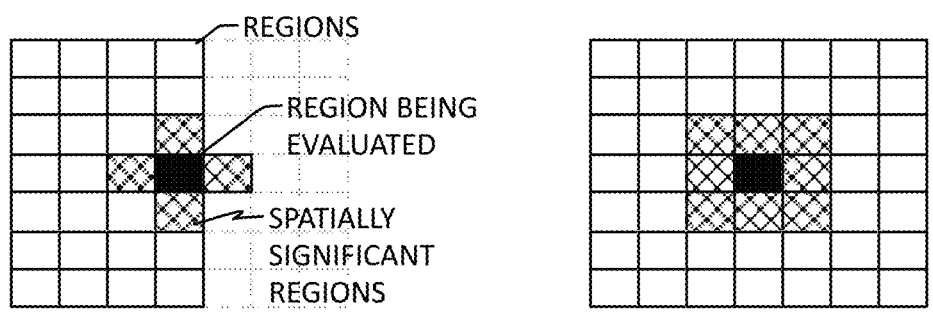
FIG. 3A
FIG. 3B
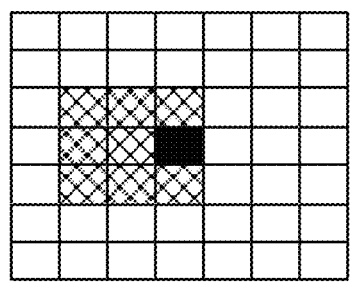
FIG. 3C
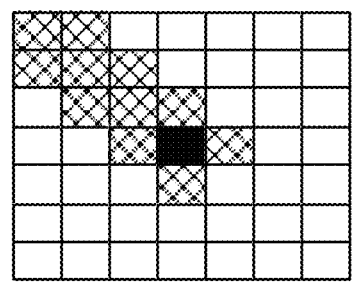
FIG. 3D

MULTI-SCALE TONE MAPPING

BACKGROUND

This disclosure relates generally to the field of image processing and, more particularly, to various techniques to generate tone mapping curves for use in image processing.

Tone mapping is the process of remapping gray levels from a first or input image to different levels in a second or output image. In general, there are two approaches to tone mapping: global and local. Global tone mapping refers to the situation where there is a single tone curve that maps input gray levels to output gray levels. Local tone mapping refers to the case where a single gray level in an input image can map to multiple gray levels in an output image depending on the spatial location and configuration of the input image. In practice, tone mapping is generally used to compress the dynamic range of an input (e.g., captured) image to fit into the dynamic range of an output device with the goal of not losing spatial and color details. This usually involves darkening the input image's bright regions and brightening up the input image's darker regions while keeping local spatial contrast intact. Compressing the global tone range and keeping local contrast are conflicting goals, and trying to do both can lead to visible grayscale reversal (e.g., "haloing" around dark or bright image features, or false gradients in the output image). To minimize grayscale reversal, tone mapping operations have traditionally employed computationally costly spatial processing or complex global-local optimization.

SUMMARY

In one embodiment the disclosed concepts provide a method to generate multi-scale tone curves. The method includes finding, for a given input image, a global tone curve. (While the input image's global tone curve need not be smooth, it should be monotonic.) The input image may then be partitioned into a first number of first sub-regions. For each first sub-region, a first local tone curve may be determined that has an output level that is constrained to the global tone curve at a first one or more luminance levels so that each first local tone curve's output at the first one or more luminance levels follows the global tone curve's monotonic behavior. If the first local tone curves provide sufficient control of shadow-boost, highlight-suppression, and contrast optimization the first local tone curves may be applied directly to the input image to generate an output image. The output image may then be stored in a memory, where the memory may be associated with a display device.

If additional control over the input image's visual presentation is needed or desired, additional layers or levels of local tone curves may be generated by repeating the actions of partitioning and determining. As disclosed herein, each of a plurality of sub-regions at one level has a corresponding sub-region at an immediately prior level. Further, each local tone curve at one level may be constrained by the local tone curve of the corresponding sub-region from the immediately previous level or layer at one or more luminance levels. The constraint may be performed so that each local tone curve's output follows the global tone curve's monotonic behavior. The local tone curves from the last layer or level so generated may be applied to the input image to generate an output image. As before, the output image may be stored to a memory and/or a display device.

The local tone curves generated at each layer may be different from the local tone curves generated at another layer. The number of sub-regions generated at each layer may also be different from that generated at another layer. The generation of tone curves corresponding to ever smaller spatial regions of the input image provides very fine control of relative grayscales between different local regions in an image without resorting to iterative optimization or expensive spatial processing. A computer executable program to implement the disclosed methods may be stored in any media that is readable and executable by a computer system. Such instructions may be stored on a variety of electronic devices. Illustrative electronic devices include, but are not limited to, mobile telephones, portable music players, personal digital assistants and personal computer systems (e.g., workstations, laptop, notebook and tablet computer systems).

BRIEF DESCRIPTION OF THE DRAWINGS

FIG. 1 illustrates the progressive nature of a multi-scale tone mapping operation in accordance with this disclosure.

FIGS. 3A-3D illustrates possible spatial relationships local tone curves may employ.

DETAILED DESCRIPTION

Figure 2:
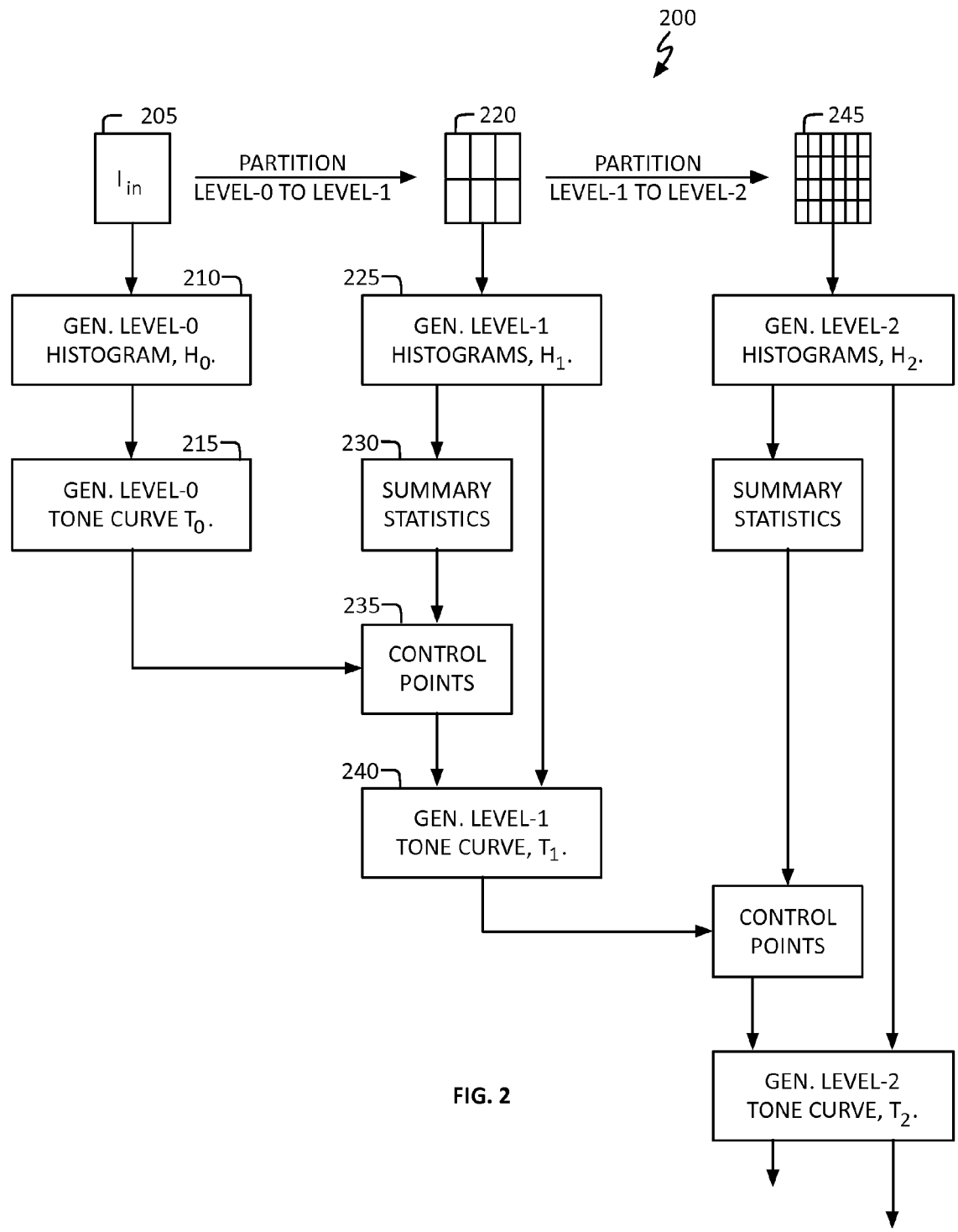
FIG. 2 shows, in block diagram form, a multi-scale tone mapping operation in accordance with one embodiment.

This disclosure pertains to systems, methods, and computer readable media to improve tone mapping operations in a graphics system. In general, multi-scale or multi-level tone curve generation techniques are disclosed. More particularly, tone curves in accordance with this disclosure may be generated at progressively increasingly local scales; where each scale's tone curve can be guided by the tone curves generated at the previous (coarser) scale. As disclosed herein, each scale's tone curve may be generated using a different method and/or optimized for different characteristics. By way of example, coarse-scale tone curves may be optimized for efficient grayscale allocation while fine-scale tone curves may be optimized for smoothness. The disclosed cross-scale guidance can help reduce grayscale reversal. The use of different optimization approaches at the different scales can help achieve a good grayscale allocation in the output without introducing local false contours caused by non-smooth tone curves.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of image and graphics processing systems having the benefit of this disclosure.

Before describing a detailed embodiment, it may be useful to obtain a visual impression of how a multi-scale tone mapping operation processes an image. Referring to FIG. 1, input image 100 may include a number of elements (e.g., pixel values based on luminance or chrominance), be characterized by a single luminance histogram from which a single global tone curve ($T_0$) may be generated. Tone curve $T_0$ may be thought of as level-0 105 in the multi-scale tone mapping operation. Input image 100 may be partitioned into j sub-regions to form level-1 110 (each sub-region including a number of elements), where each sub-region 115 may be characterized by a single level-1 histogram from which a single level-1 tone curve ($t_1$) may be generated. Each sub-region in level-1 110 may itself be partitioned into k sub-regions to form level-2 120, where each sub-region 125 may be characterized by a single level-2 tone curve ($t_2$). Again, each sub-region in level-2 may be partitioned into m sub-regions to form level-3 130, where each sub-region 135 may be characterized by a single level-3 tone curve ($t_3$). This process may be repeated until the resulting tone curves (e.g., the collection of level-3 tone curves) provide the desired level of image enhancement. In some embodiments, the computational cost of going to lower levels may limit the ultimate depth to which the disclosed techniques may be taken. In other embodiments, the visual difference provided by a "deeper" layer (more local tone curves) may not be detectable by one viewing the image and may, at least in some embodiments, not be justified. As described here, each level provides a finer scale of control than any preceding level, and a more coarse scale of control than any succeeding level. In the example shown in FIG. 1, j=k=m=4. This should not be considered as a limiting description. Each level or scale may be partitioned into a different number of sub-regions. Further, the tone curve generation method used at each scale may be different. For example, coarse-scale tone curves may be optimized for efficient grayscale allocation (e.g., level-1 tone curves, $t_1$), while fine-scale tone curves may be optimized for smoothness (e.g., level-3 tone curves, $t_3$).

Referring to FIG. 2, multi-scale tone mapping operation 200 in accordance with one embodiment will now be described. For each input image 205, global luminance histogram $H_0$ may be found (block 210) and used to generate global tone curve $T_0$ (block 215). Tone curve $T_0$ may determine how bright the resulting output image will be on a global scale. As noted previously, any tone curve algorithm may be used to generate $T_0$. Level-0 tone curve $T_0$ should be monotonic but does not need to be smooth, since it will not be applied directly to input image 200. One function of level-0 tone curve $T_0$ is to guide the generation of level-1 local tone curves ($t_1$) so as to produce a stable output brightness and to minimize large scale grayscale reversal.

Next, input image 200 may be partitioned or divided into $m_1 \times n_1$ regions as shown in 220. While $m_1$ and $n_1$ can take on any integer value, it has been found beneficial to keep these values small at this level (e.g., 4×3). For each region in level-1 image 220, a luminance histogram $h_1$ may be compiled (block 225). A local tone curve $t_1$ for each region may then be generated such that the general brightness-boost of each region is determined by $T_0$, whereas the contrast of each region is determined by that region's luminance histogram $h_1$. The input luminance level of a local region, designated generally as $M(h_1)$, can be described by any reasonable choice of summary statistics (block 230). For example, one could use the mean, median, or modal luminance levels of the region, all of which can be estimated from the region's local histogram $h_1$. In accordance with one embodiment, when generating a local tone curve the output gray level at input gray level $M(h_1)$ may be constrained at $T_0(M(h_1))$, so that the output of each level-1 local tone curve at $M(h_1)$ follows the monotonic tone relationship of $T_0$, thus avoiding gross grayscale reversal (block 235).

The above constraint constrains one point on the local tone curve. Thus, after generating a local tone curve $t_a$, $t_a$ may be adjusted so that it passes through the $[M(h_1), T_0(M(h_1))]$ point. Many different approaches can be used for this adjustment. For example, the simplest adjustment may be to apply a power function to the tone curve. Assuming the output of $t_a$ is normalized to the range 0 to 1, in one embodiment the desired local tone curve $t_1$ may be calculated as:

$$t_1 = t_a^k, \quad \text{where} \quad k = \frac{\log(T_0(M(h_1)))}{\log(t_1(M(h_1)))} \qquad \text{EQ. 1}$$

(block 240). It is also possible to adjust each region's local tone curve to go through the control point during the tone curve generation stage. (As used here, the term "control point" refers to the specific rendering reference position such as the mean of the post tone mapped region lightness as determined by $T_0$ and to be satisfied by a local tone curve, $t_1$.) It may be recognized, however, that methods to achieve this would be specific to each tone curve generation algorithm.

The local tone curves generated at level-1 in accordance with block 240 may be used directly to tone map input image 205. If finer local control of shadow-boost, highlight-suppression, and contrast optimization is desired, multi-scale tone mapping operation 200 may continue to level 2. The level-2 (or higher) tone curve generation process is substantially the same as described above with respect to level-1, with two notable differences. First, level-2 tone curves correspond to smaller local regions of image 220 so as to afford finer differentiation of tone curves between regions. To do this, image 220 may be partitioned into $m_2 \times n_2$ regions as shown in image 245, where $m_2 > m_1$, and $n_2 > n_1$. In one implementation, level-2 local regions are half the size of level-1 regions on either dimension, resulting in 4 times as many local regions and thus 4 times as many local tone curves compared to level-1. For further levels, $m_{s+1} > m_s$, and $n_{s+1} > n_s$. Secondly, for each level-2 region $r_2$, its local tone curve t2's summary brightness-boost may be controlled by the corresponding level-1 tone curves t1 instead of by the global tone curve T0. As illustrated in FIG. 2, every level's tone curve generation is constrained by the tone curve result from the immediate previous level. Since level-1 has multiple tone curves, the control point for t2 should be determined from multiple curves in the set of level-1 tone curves T1. For example, let $t_{1a}, t_{1b}, t_{1c}, t_{1d}$ be the 4 tone curves corresponding to level-1 regions closest to the level-2 region r2, then the output luminance level for $t_2$ at $M(h_2)$ may be given as:

$$t_1(M(h_2)) = \frac{(w_a)t_{1a}(M(h_2)) + (w_b)t_{1b}(M(h_2)) + (w_c)t_{1c}(M(h_2)) + (w_d)t_{1d}(M(h_2))}{w_a + w_b + w_c + w_d},$$ EQ. 2 where $w_a$, $w_b$, $w_c$, and $w_d$, are weights that are inversely proportional to level-2 regions $r_2$'s distances to level-1 regions a, b, c and d. The level-2 calculations may be repeated to any number of additional levels though, it has been determined, with diminishing tonal quality gains as more levels are added. In many embodiments, it has been found adequate to stop at level-2 and, sometimes, at level-1 if faster computation is desired.

Here, as elsewhere in this disclosure, multi-scale tone mapping curves have been derived from luminance histograms. For example, $H_0$ has been used to indicate the input image's level-0 (global) histogram. Similarly, $h_2$ has been used to indicate a level-2 region's histogram. This should not be understood to mean the use of histograms, however they may be realized, is required to generate tone curves at each level. In general, any consistently used statistic of luminance or intensity may be used to create tone curves adaptive to the specific luminance composition a image/region.

It should also be noted that the embodiment expressed by EQ. 2 is but a single example. As noted, EQ. 2 is directed to an embodiment in which the four closest pixels are significant (see FIG. 3A). However, other embodiments may require or benefit from different spatial relationships. Referring to FIG. 3B, for example, the eight (8) closest pixels may be important. If this is so, EQ. 2 may be modified to include eight (8) possible constraint values and weights. In yet other embodiments, constraining relationships such as $M(h_j)$ and $T_{(j-1)\alpha}(M(h_j))$ may rely on other, non-symmetric, spatial patterns such as those illustrated in FIGS. 3C and 3D. (As used here, $T_{(j-1)\alpha}(\ )$, represents the $\alpha^{th}$ tone curve corresponding the (j−1)-level region in the desired spatial relationship to the level-j region whose local tone curve is being determined.) Where non-symmetric spatial relationships are important, weighting values 'w' may not be represented by inverse distance relations as used above in EQ. 2. The precise relationships will depend upon the specific spatial pattern being used.

It has been found that the progressive propagation of grayscale control to finer and finer local tone curves allows for very efficient control of relative grayscale between different local regions without resorting to iterative optimization or expensive spatial processing (in terms of time, memory, computational resources or any combination thereof). The architecture outlined in FIG. 2 also supports the use of different tone curve generation methods at different levels (or different tuning of the same method) to achieve each level's unique optimization goals. It has been found that the choice of a very low cost tone curve generation algorithm at level-2 and above can result in significant savings in computational cost.

The multi-scale nature of the disclosed tone mapping operation also allows for easy control of overall image brightness at different "localness" levels, by modifying control points at global, level-1, or level-N tone curves. Adjustment at the global level may be used to match the general brightness of images captured at different exposure settings. For example, if an image is under-exposed by 's' stops, and the output tone level is $t_m$ at median pixel value m of a normally exposed image of the same scene, then the general brightness of the under-exposed image to the normally exposed image may be matched by forcing a control point $[m/2^{-s}, t_m]$ on the global tone curve when tone mapping the under-exposed image. The adjustment on the global tone curve will propagate through the levels of local tone curves, resulting in properly matched overall brightness on the output image without having to clip highlights in the under-exposed image. The disclosed methodology applies in the same way when the brightness of an over-exposed image needs to be adjusted to match that of a normally exposed image.

Figure 4:
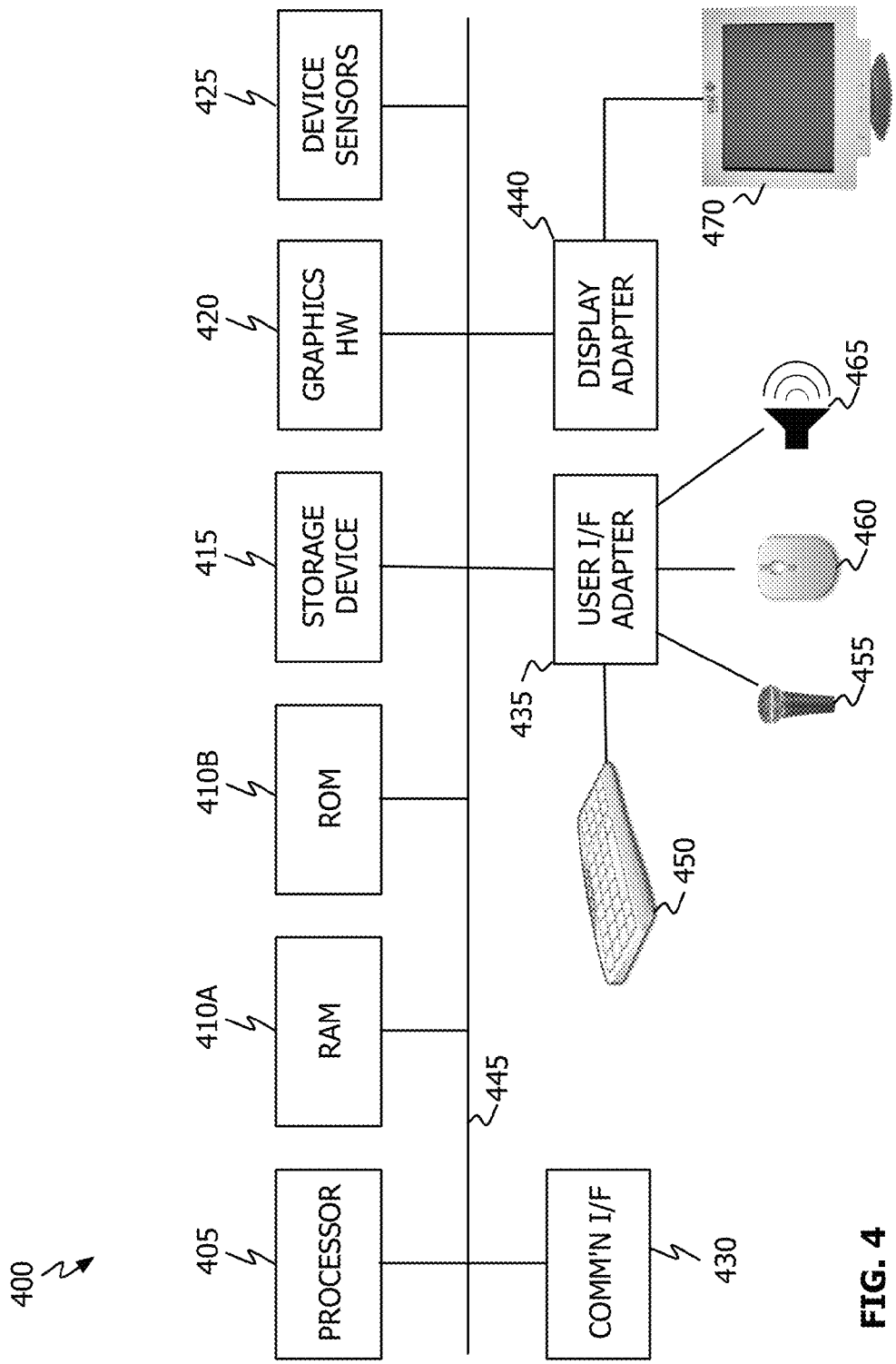
FIG. 4 shows, in block diagram form, a computer system in accordance with one embodiment.

Referring to FIG. 4, the disclosed embodiments may be performed by representative computer system 400 (e.g., a general purpose computer system or a dedicated image processing workstation). Computer system 400 may include one or more processors 405, memory 410 (410A and 410B), one or more storage devices 415, graphics hardware 420, device sensors 425 (e.g., proximity sensor/ambient light sensor, accelerometer and/or gyroscope), communication interface 430, user interface adapter 435 and display adapter 440—all of which may be coupled via system bus or backplane 445. Memory 410 may include one or more different types of media (typically solid-state) used by processor 405 and graphics hardware 420. For example, memory 410 may include memory cache, read-only memory (ROM), and/or random access memory (RAM). Storage 415 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 410 and storage 415 may be used to retain media (e.g., audio, image and video files), preference information, device profile information, computer program instructions organized into one or more modules and written in any desired computer programming language, and any other suitable data. When executed by processor 405 and/or graphics hardware 420 such computer program code may implement one or more of the methods described herein. Communication interface 430 may be used to connect computer system 400 to one or more networks. Illustrative networks include, but are not limited to: a local network such as a USB network; a business' local area network; or a wide area network such as the Internet and may use any suitable technology (e.g., wired or wireless). User interface adapter 435 may be used to connect keyboard 450, microphone 455, pointer device 460, speaker 465 and other user interface devices such as a touchpad and/or a touch screen (not shown). Display adapter 440 may be used to connect one or more display units 470.

Processor 405 may execute instructions necessary to carry out or control the operation of many functions performed by computer system 400 (e.g., such as the generation of multi-scale tone maps in accordance with FIG. 2). Processor 405 may, for instance, drive display 410 and receive user input from user interface 415. User interface 415 can take a variety of forms, such as a button, keypad, dial, a click wheel, keyboard, display screen and/or a touch screen. Processor 405 may be a system-on-chip such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable graphics processing units (GPUs).

Figure 5:
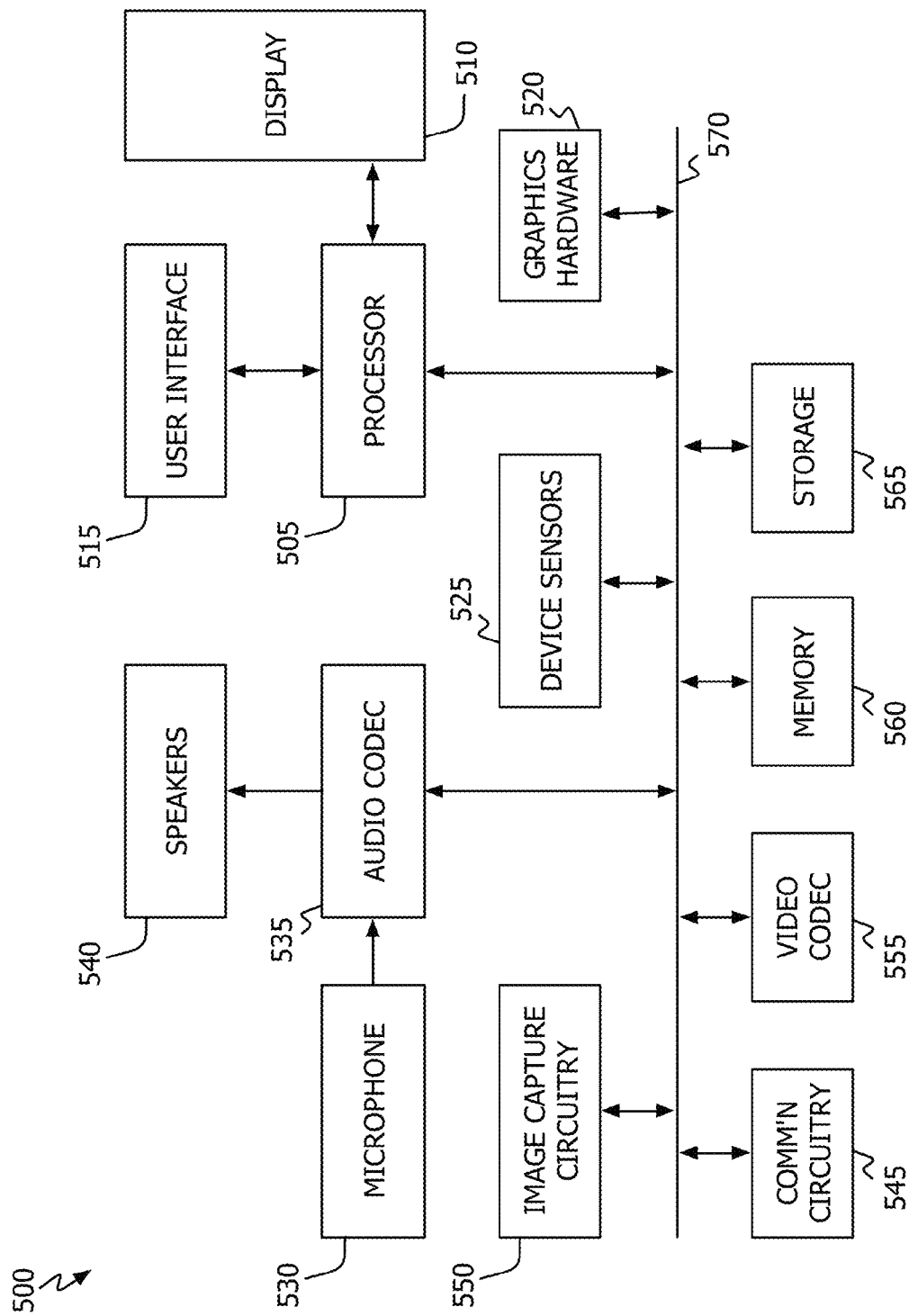
FIG. 5 shows, in block diagram form, a multi-function electronic device in accordance with one embodiment.

Referring to FIG. 5, a simplified functional block diagram of illustrative electronic device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, image capture circuit or unit 550, video codec(s) 555, memory 560, storage 565, and communications bus 570.

Processor 505 may execute instructions necessary to carry out or control the operation of many functions performed by device 500 (e.g., such as the generation of tone curves in accordance with FIG. 2). Processor 505 may, for instance, drive display 510 and receive user input from user interface 515. User interface 515 can take a variety of forms, such as a button, keypad, dial, a click wheel, keyboard, display screen and/or a touch screen. Processor 505 and Graphics hardware 520 may be as described above with respect to FIG. 4.

Image capture circuitry 550 may capture still and video images that may be processed to generate images and may, in accordance with this disclosure, include processing images in accordance with FIG. 2. Output from image capture circuitry 550 may be processed, at least in part, by video codec(s) 555 and/or processor 505 and/or graphics hardware 520, and/or a dedicated image processing unit incorporated within circuitry 550. Images so captured may be stored in memory 560 and/or storage 565. Memory 560 and storage 565 may be as described above with respect to FIG. 4.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device comprising instructions stored thereon to cause one or more processors to:
    obtain an input image characterized by a single region;
    find a global tone curve of the input image that exhibits monotonic behavior;
    partition the input image's single region into a first plurality of first sub-regions;
    determine, for each first sub-region, a first local tone curve that yields an output that is constrained to the global tone curve at a first one or more luminance levels;
    repeat the partition and determine instructions a determined number of times, wherein each time the partition instructions are repeated each sub-region resulting from an immediately prior partition (a prior sub-region) is further partitioned into a next plurality of next sub-regions, wherein each next plurality of next sub-regions has a corresponding prior sub-region that has a prior local tone curve, wherein each time the determine instructions are repeated a next local tone curve is determined for each of the next plurality of next sub-regions, and wherein the determined next local tone curve yields an output of each next sub-region's next local tone curve that is constrained to the next sub-region's corresponding prior sub-region's prior local tone curve at a next one or more luminance levels;
    generate an output image based on the input image, wherein the instructions to cause the one or more processors to generate the output image include instructions to:
        apply each of the first local tone curves to the input image to generate the output image when the partition and determine instructions are not repeated, and
        apply each of the next local tone curves from a last repeat of the partition and determine instructions to the input image to generate the output image when the partition and determine instructions are repeated one or more times; and
    store the output image in a memory.

2. The non-transitory program storage device of claim 1, wherein the instructions to cause the one or more processors to store the output image in a memory comprise instructions to cause the one or more processors to store the output image in a memory corresponding to a display device.

3. The non-transitory program storage device of claim 1, wherein each of the first plurality of first local tone curves is generated differently than at least one of the next plurality of next local tone curves.

4. The non-transitory program storage device of claim 1, wherein the instructions to cause the one or more processors to determine, for each first sub-region, a first local tone curve further comprise instructions to cause the one or more processors to determine a first luminance histogram for each of the first sub-regions.

5. The non-transitory program storage device of claim 4, wherein the instructions to cause the one or more processors to determine, for each first sub-region, a first local tone curve that yields an output that is constrained to the global tone curve at a first one or more luminance levels further comprise instructions to cause the one or more processors to determine, for each first sub-region, a first local tone curve that is constrained at $T_0(M(h))$, where h represents a histogram of a first sub-region, $M(h)$ represents an input luminance level of the first sub-region and $T_0(M(h))$ represents an output luminance level of the global tone curve at the input luminance level $M(h)$.

6. The non-transitory program storage device of claim 5, wherein the instructions to cause the one or more processors to determine a next local tone curve for each of the next plurality of next sub-regions, further comprise instructions to cause the one or more processors to determine a next luminance histogram for each of the next sub-regions.

7. The non-transitory program storage device of claim 5, wherein the input luminance level of a first sub-region $M(h)$ is given by one of the first sub-region's mean luminance value, median luminance value, and a modal luminance value.

8. The non-transitory program storage device of claim 4, wherein the instructions to cause the one or more processors to determine a next local tone curve for each of the next plurality of next sub-regions further comprise instructions to cause the one or more processors to determine, for each next sub-region a next local tone curve that is constrained at $t(M(h))$, where h represents a luminance histogram of a next sub-region, $M(h)$ represents an input luminance level of the next sub-region, and $t(M(h))$ represents an output luminance level of the next sub-region's corresponding prior sub-regions prior local tone curve at the input luminance level $M(h)$.

9. The non-transitory program storage device of claim 1, wherein the determined number of times is selected based on one or more of:

a desired level of image enhancement, and an ability of the one or more processors to perform the repetition.

10. An electronic device, comprising:
a memory;
a display device operatively coupled to the memory; and
one or more processors operatively coupled to the memory and the display device and configured to execute instructions stored in the memory to cause the electronic device to—
  obtain, from the memory, an input image characterized by a single region,
  find a global tone curve of the input image that exhibits monotonic behavior,
  partition the single region into a first plurality of first sub-regions,
  determine, for each first sub-region, a first local tone curve that yields an output that is constrained to the global tone curve at a first one or more luminance levels,
  repeat the partition and determine instructions a determined number of times, wherein each time the partition instructions are repeated each sub-region resulting from an immediately prior partition (a prior sub-region) is further partitioned into a next plurality of next sub-regions, wherein each next plurality of next sub-regions has a corresponding prior sub-region that has a prior local tone curve, wherein each time the determine instructions are repeated a next local tone curve is determined for each of the next plurality of next sub-regions, and wherein the determined next local tone curve yields an output of each next sub-region's next local tone curve that is constrained to the next sub-region's corresponding prior sub-region's prior local tone curve at a next one or more luminance levels,
  generate an output image based on the input image, wherein the instructions to cause the electronic device to generate the output image include instructions to:
    apply each of the first local tone curves to the input image to generate the output image when the partition and determine instructions are not repeated, and
    apply each of the next local tone curves from a last repeat of the partition and determine instructions to the input image to generate the output image when the partition and determine instructions are repeated one or more times, and
  store the output image in the memory.

11. The electronic device of claim 10, wherein the instructions to cause the one or more processors to store the output image in the memory comprise instructions to cause the one or more processors to store the output image in a memory corresponding to the display device.

12. The electronic device of claim 10, wherein each of the first plurality of first local tone curves is generated differently than at least one of the next plurality of next local tone curves.

13. The electronic device of claim 10, wherein the instructions to cause the one or more processors to determine, for each first sub-region, a first local tone curve further comprise instructions to cause the one or more processors to determine a first luminance histogram for each of the first sub-regions.

14. The electronic device of claim 13, wherein the instructions to cause the one or more processors to determine, for each first sub-region, a first local tone curve that yields an output that is constrained to the global tone curve at a first one or more luminance levels further comprise instructions to cause the one or more processors to determine, for each first sub-region, a first local tone curve that is constrained at $T_0(M(h))$, where h represents a histogram of a first sub-region, $M(h)$ represents an input luminance level of the first sub-region and $T_0(M(h))$ represents an output luminance level of the global tone curve at the input luminance level $M(h)$.

15. The electronic device of claim 14, wherein the input luminance level of a first sub-region $M(h)$ is given by one of the first sub-region's mean luminance value, median luminance value, and a modal luminance value.

16. The electronic device of claim 10, wherein the determined number of times is selected based on one or more of:
a desired level of image enhancement, and
an ability of the electronic device to perform the repetition.

17. A method to process an image, comprising:
  obtaining, from a memory, an input image characterized by a single region;
  finding a global tone curve of the input image that exhibits monotonic behavior;
  partitioning the single region into a first plurality of first sub-regions;
  determining, for each first sub-region, a first local tone curve that yields an output that is constrained to the global tone curve at a first one or more luminance levels;
  repeating the partitioning and determining a determined number of times, wherein each time the partitioning is repeated, each sub-region resulting from an immediately prior partitioning (a prior sub-region) is further partitioned into a next plurality of next sub-regions, wherein each next plurality of next sub-regions has a corresponding prior sub-region that has a prior local tone curve, wherein each time the determining is repeated a next local tone curve is determined for each of the next plurality of next sub-regions, and wherein the determined next local tone curve yields an output of each next sub-region's next local tone curve that is constrained to the next sub-region's corresponding prior sub-region's prior local tone curve at a next one or more luminance levels;
  generating an output image based on the input image, wherein the generation of the output image includes:
    applying each of the first local tone curves to the input image to generate the output image when the partitioning and determining are not repeated, and
    applying each of the next local tone curves from a last repeat of the partitioning and determining to the input image to generate the output image when the partitioning and determining are repeated one or more times; and
  storing the output image in a memory.

18. The method of claim 17, wherein storing the output image in the memory comprises storing the output image in a memory corresponding to a display device.

19. The method of claim 17, wherein each of the first plurality of first local tone curves is generated differently than at least one of the next plurality of next local tone curves.

20. The method of claim 17, wherein determining, for each first sub-region, a first local tone curve further comprises determining a first luminance histogram for each of the first sub-regions.

21. The method of claim 20, wherein determining, for each first sub-region, a first local tone curve that yields an output that is constrained to the global tone curve at a first one or more luminance levels further comprises determining, for each first sub-region, a first local tone curve that is constrained at $T_0(M(h))$, where h represents a histogram of a first sub-region, $M(h)$ represents an input luminance level of the first sub-region and $T_0(M(h))$ represents an output luminance level of the global tone curve at the input luminance level $M(h)$.

22. The method of claim 21, wherein the input luminance level of a first sub-region $M(h)$ is given by one of the first sub-region's mean luminance value, median luminance value, and a modal luminance value.

23. The method of claim 17, wherein the determined number of times is selected based on one or more of:
   a desired level of image enhancement, and
   an ability to perform the repetition.

* * * * *